United States Patent
Stocchiero

(10) Patent No.: US 7,868,255 B2
(45) Date of Patent: Jan. 11, 2011

(54) SEALING RING TO BE APPLIED TO CONNECTION HOLES OF CELLS OF AN ACCUMULATOR

(76) Inventor: Franco Stocchiero, Via G. Zanella, 34/A, I-36050 Montorso Vicentino (VI) (IT)

(*) Notice: Subject to any disclaimer, the term of this patent is extended or adjusted under 35 U.S.C. 154(b) by 406 days.

(21) Appl. No.: 12/000,157

(22) Filed: Dec. 10, 2007

(65) Prior Publication Data
US 2008/0116648 A1   May 22, 2008

Related U.S. Application Data

(62) Division of application No. 10/989,428, filed on Nov. 17, 2004, now abandoned.

(30) Foreign Application Priority Data

Jun. 11, 2002 (IT) .......................... VI20020018 U
Jun. 10, 2003 (EP) ................................. 03013031

(51) Int. Cl.
*H02G 3/18* (2006.01)

(52) U.S. Cl. .................... 174/153 G; 174/151; 248/56; 439/604; 277/606

(58) Field of Classification Search ............. 174/152 G, 174/153 G, 151; 16/2.1, 2.2, 2.5; 248/56; 439/604, 587; 277/606, 602, 652
See application file for complete search history.

(56) References Cited

U.S. PATENT DOCUMENTS

| | | | | | |
|---|---|---|---|---|---|
| 2,309,741 | A | * | 1/1943 | Woodward | .................. 439/458 |
| 4,447,103 | A | * | 5/1984 | Werth et al. | ................. 439/271 |
| 5,814,764 | A | * | 9/1998 | Kohaut | ........................ 174/360 |

* cited by examiner

*Primary Examiner*—Dhiru R Patel
(74) *Attorney, Agent, or Firm*—Dykema Gossett PLLC

(57) ABSTRACT

A sealing ring for a frusto-conical connection hole through a divider wall in an accumulator includes a plate which contacts one side of the divider wall and a sheath which extends through the connection hole, the sheath defining an outer surface which expands in frusto-conical fashion from a base at the plate to a free end and an inner surface which can be cylindrical or frusto-conical.

5 Claims, 2 Drawing Sheets

SEALING RING TO BE APPLIED TO CONNECTION HOLES OF CELLS OF AN ACCUMULATOR

CROSS-REFERENCE TO RELATED APPLICATION

This application is a division of application Ser. No. 10/989,428, filed Nov. 17, 2004, now abandoned.

BACKGROUND OF THE INVENTION

1. Field of the Invention

The invention relates to a sealing ring to be applied to connection holes of the cells of an accumulator.

2. The Prior Art

As is known, electrical accumulators substantially consist of a container made from polypropylene equipped on the inside with a plurality of divider walls. The walls define cells inside in which the elements of the accumulator and the electrolyte are arranged.

The elements consist of a plurality of plates arranged interfacing each other and electrically and mechanically connected through connection rods made from lead, known as straps.

The rods of the adjacent elements with opposite polarity are connected together through openings consisting of connection through holes with a frusto-conical cross-section made on the divider walls.

The electromechanical connection is obtained by welding, making an electrical current of an intensity such as the make the parts in contact melt pass through the rods.

To avoid the electrolyte flowing from one cell to the other and to avoid the divider wall being damaged during welding, an insert is used, known as a sealing ring.

The sealing ring comprises a circular plate equipped with a through hole axially to which is arranged a cylindrical sheath with a diameter equal to the connection hole and a length equal to or less than the thickness of the divider wall.

The ring is coupled in the connection hole and is generally made from polycarbonate, which as known has a higher melting point than that of polypropylene.

The sheath being placed between the divider wall and the connection rods prevents the wall itself from melting during welding.

The circular plate which is placed in contact with the divider wall carries out the function of a gasket and ensures the airtight seal of each cell.

A first drawback of the described sealing ring consists of the fact that the coupling with the connection hole is not stable and is not very reliable.

This is substantially due to the fact that both the sealing ring and the connection hole are obtained by moulding or punching and therefore have dimensional tolerances such as not to guarantee an ideal coupling.

Another drawback linked to the previous one consists of the fact that the sealing ring must be inserted manually and contextually to the arranged of the elements. This is to avoid the ring accidentally detaching from the wall.

A further drawback consists of the fact that the contact region between the cylindrical sheath and the surfaces of the connection hole is limited to an annular region near to the plate.

This is substantially due to the fact that, as stated previously, the sheath has a circular cross-section whereas the connection hole has a frusto-conical cross-section.

Another drawback linked to the previous one consists of the fact that the limited contact surface between sheath and the surfaces of the connection hole does not allow an ideal dissipation of the heat which develops during the welding of the rods. Moreover, the heat concentrating in the annular contact region can compromise the airtight seal of the cell.

The purpose of the present invention is to overcome these drawbacks.

In particular, a first purpose of the invention is to provide a sealing ring which stably coupled with the connection hole.

A further purpose is to provide a ring which can be inserted in the corresponding connection hole even automatically and at a different time to the insertion of the elements of the accumulator.

Another purpose is to provide a sealing ring which allows a better dissipation of the heat which develops during the welding of the rods.

A further purpose is to provide a ring which is cost-effective and which can be provided by moulding.

The last but not least purpose is to provide a protective ring which does not require specific tools for insertion in the corresponding connection hole.

SUMMARY OF THE INVENTION

Said purposes are accomplished by a protective ring to be applied to frusto-conical connection holes of the cells of an accumulator which, in accordance with the main claim, comprises a plate equipped with a through hole axially to which is arranged the base of a sheath suitable for coupling in said connection hole, characterised in that at least a portion of the cross-section of said sheath has a greater diameter than that of the base of said sheath.

Advantageously, the reliability of the coupling does not depend upon the dimensional tolerances of the hole and of the cylindrical sheath but upon the geometric shape of the sheath itself.

Again advantageously, the reliability accomplished ensures that the ring, once inserted, does not accidentally detach from the wall, for example during the transportation of the container.

This allows such an assembly step to be moved to any point in the production chain of the accumulator.

Said purposes and advantages shall be made clearer during the description of a preferred embodiment given for indicating and not limiting purposes with reference to the attached tables of drawings.

DETAILED DESCRIPTION OF THE PREFERRED EMBODIMENTS

Figure 1:
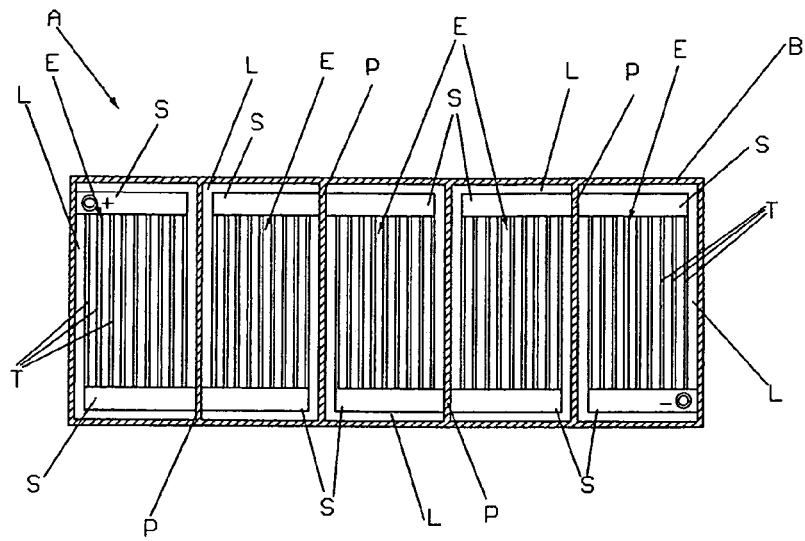
FIG. 1 represents a top view of a section of an accumulator equipped with the protective ring object of the invention.

The protective ring to be applied to frusto-conical connection holes 5 of the cells L of an accumulator A of the type represented in FIG. 1. The sealing ring of the invention is represented in detail in FIGS. 2, 3 and 4 where it is wholly indicated with reference numeral 1.

The accumulator A substantially consists of a container B made from polypropylene equipped on the inside with a plurality of vertical divider walls P which define the cells L inside which the elements of the accumulator and the electrolyte are arranged.

The elements E, as stated previously, consist of a plurality of plates T arranged interfaced with each other electrically and mechanically connected through connection rods S made from lead.

Figure 2:
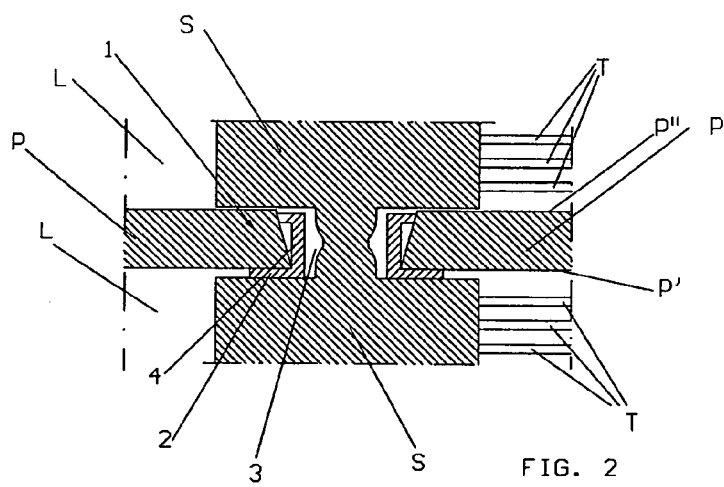
FIG. 2 represents a section view of the protective ring object of the invention inserted in a connection hole.
Figure 3:
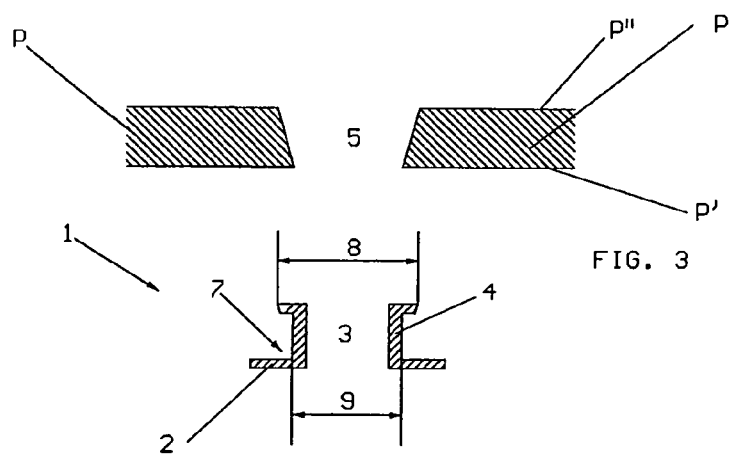
FIG. 3 represents another section view of the ring of FIG. 2 before insertion in a corresponding connection hole.

As far as the sealing ring 1 is concerned, it comprises a plate 2 equipped with a through hole 3 axially to which is arranged the base 7 of a sheath 4, shown in detail in FIGS. 2 and 3, suitable for coupling with the connection hole 5 made on the divider wall P and extending from a first side P' toward an opposite second side P''.

The invention foresees that the sheath 4 has a portion of its cross-section with a diameter 8 greater than the diameter 9 of the base 7 of the sheath 4 itself.

This provides an undercut which prevents the accidental decoupling of the protective ring 1 from the hole 5.

It should be observed that the connection hole 5 is provided by punching and therefore has a substantially frusto-conical cross-section.

The through hole 3 of the sheath 4 which allows the passage of the rods S has a circular cross-section and a length equal to or less than the thickness of the divider wall P.

As far as the plate 2 is concerned, it is circular shaped although in different embodiments it can be of different geometric shapes.

Figure 4:
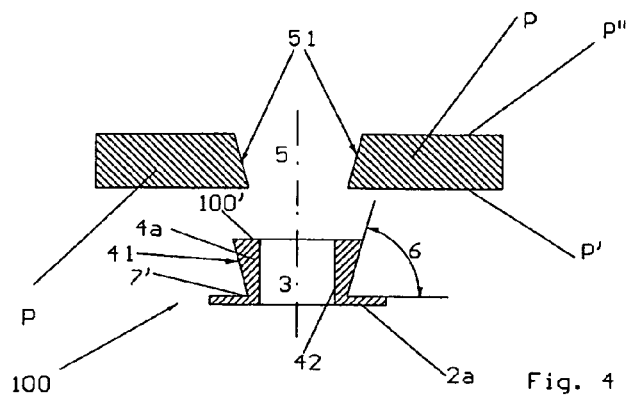
FIG. 4 represents a section view of a variant embodiment of the ring of FIG. 2 before insertion in a corresponding connection hole.
Figure 5:
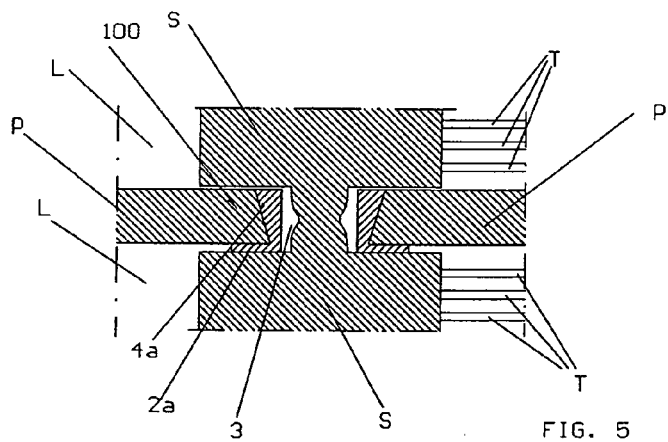
FIG. 5 represents a section view of the ring of FIG. 4 inserted in a corresponding connection hole.

A variant embodiment wholly indicated with reference numeral 100 in FIGS. 4 and 5 differs from the previous embodiment in that the sheath 4a has a substantially frusto-conical outer longitudinal cross-section.

In particular, the taper of the frusto-conical surface 41 diverges moving away from base 7' to the free end 100'.

The angle 6 defined by the intersection of the outer surface 41 of the sheath 4 with the plate 2 in FIG. 4 is less than 90 degrees. The inner surface 42 is cylindrical.

More generally, such an angle $\delta$ is preferably equal to the inclination of the walls of the connection hole 5.

It should also be observed that the outer profile of the sheath 4 substantially matches the profile of the hole 5.

Another embodiment which is not represented differs from the previous one in that a portion of the profile of the outer surface 41 of the sheath 4 is frusto-conical.

Figure 6:
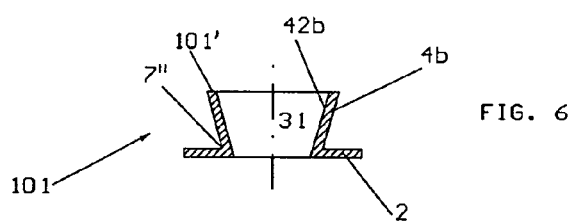
FIG. 6 represents a section view of another variant embodiment of the ring of FIG. 2 before insertion in a corresponding connection hole.
Figure 7:
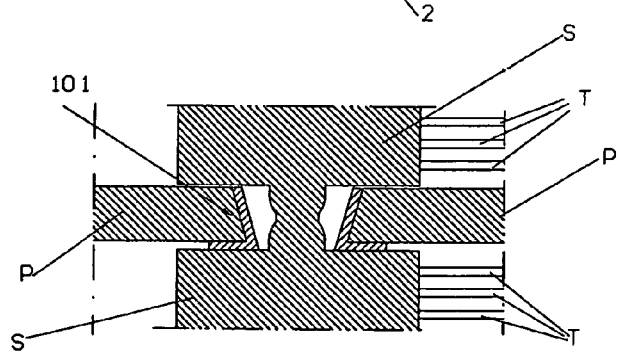
FIG. 7 represents a section view of the ring of FIG. 6 inserted in a corresponding connection hole.

Another variant embodiment wholly indicated with reference numeral 101 in FIG. 6 differs in that the sheath 4b has the through hole 31 with a frusto-conical cross-section, i.e., the inner surface 42 expands in frusto-conical fashion from the base 7'' to the free end 101'.

The insertion of the protective ring 1 in the hole 5 foresees that the operator or a manipulator arranges the ring itself at the hole and then forces it against the wall. The flexibility of the ring 1 and in particular of the sheath 4 allows the latter to deform until it snaps into the hole 5.

The flexibility of the sheath 4 substantially depends upon both the small size of the sheath and the intrinsic characteristics of the material used to realise it which, as stated previously, is polycarbonate or alternative materials.

The reliability of the coupling is ensured in this case by the interference of the protrusion of the sheath 4 with the walls of the hole 5.

This allows a coupling which is secure to be obtained and such as to allow the transportation and movement of the container B without the risk of the ring 1 detaching from the wall P.

The assembly of the elements and of the accumulator can thus be carried out even at different times and places, following the known procedures already described.

It is important to observe how the proposed solution allows rings 1, 100, 101 to be realised the dimensional characteristics of which are no longer critical for a reliable connection to the wall.

It should also be observed that the proposed ring, especially in the embodiments indicated with 100 and 101, allows a better dissipation of the heat which develops in the welding step of the rods S.

This is due to the fact the whole outer surface of the sheath 4a and 4b is in contact with the walls 51 of the connection hole 5.

Although the invention has been described referring to the attached drawings, it can undergo modifications in the embodiment step, all covered by the same inventive concept expressed by the attached claims.

The invention claimed is:

1. A combination of (a) an accumulator which includes a divider wall having first and second opposite sides and includes a connection hole therethrough, said connection hole expanding from a first diameter at said first side to a second diameter at said second side, and (b) a sealing ring which extends into said connection hole, said sealing ring comprising a plate which contacts said first side of said wall and seals said connection hole at said first side and a sheath which extends from said plate into said connection hole a distance up to said second side, said sheath having a base connected to said plate and an opposite free end which seals against an inner surface of said wall which defines said connection hole, and said sealing ring including a through hole that extends through said plate and said sheath, said sheath defining an outer surface which expands from said base to said free end.

2. The combination according to claim 1, wherein said connection hole expands in frusto-conical fashion and the outer surface of said sheath expands in frusto-conical fashion.

3. The combination according to claim 2, wherein said sheath defines an inner surface which expands in frusto-conical fashion from said base to said free end.

4. The combination according to claim 2, wherein said sheath defines an inner surface which is cylindrical.

5. The combination according to claim 1, wherein said plate is substantially circular.

* * * * *